July 20, 1943.   C. M. BEAMER   2,324,755
DISTILLATION PROCESS
Filed June 14, 1940
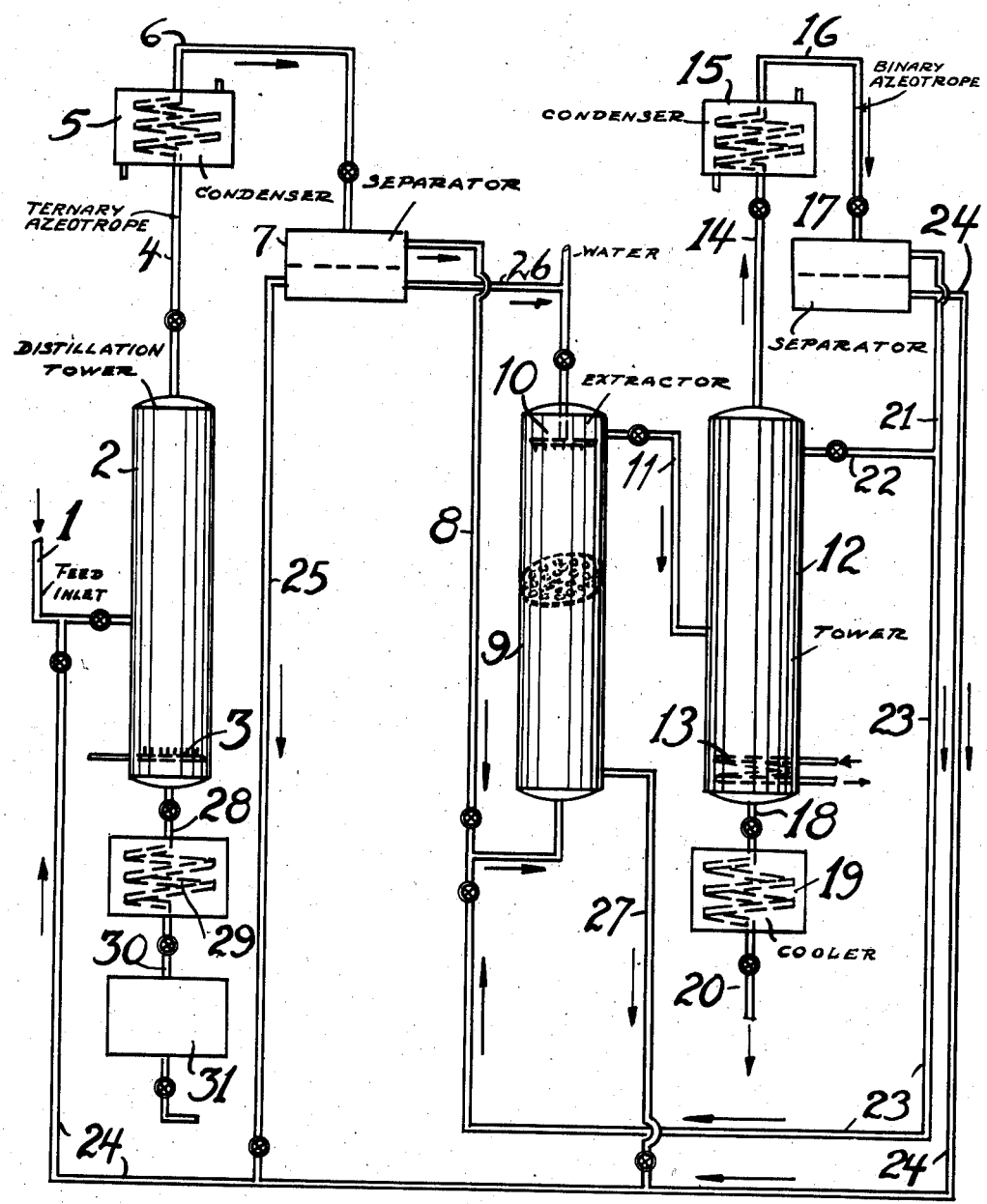
Clayton M. Beamer Inventor
By J. C. Small Attorney Patented July 20, 1943

2,324,755

UNITED STATES PATENT OFFICE 2,324,755

DISTILLATION PROCESS

Clayton M. Beamer, Roselle, N. J., assignor to Standard Alcohol Company

Application June 14, 1940, Serial No. 340,528

4 Claims. (Cl. 202—42)

This invention relates to the separation of the constituents of azeotropic mixtures especially of ternary azeotropes. The invention in its broad aspects and principles is applicable to all azeotropic mixtures composed of liquids one of which is soluble in a solvent in which the other or others are relatively insoluble. As the practical application of most value the invention is concerned with the dissolution of ternary azeotropes formed in the preparation of many ethers and alcohols.

When the boiling points of constituents of liquid mixtures are appreciably different, substances can usually be separated by distillation and subsequent fractionation of the vapors. In the case of some liquid mixtures complete separation of the constituents cannot be effected in this manner because the constituents when present in certain proportions form constant boiling mixtures even though in many cases the boiling points are widely separated and a phasal difference occurs.

There are two types of constant boiling mixtures. The components in the first type of constant boiling mixtures are substantially immiscible, the composition of the vapor at the constant boiling temperature is directly proportional to the partial pressures of the constituent substances at that temperature, and assuming no change in the ambient pressure, the temperature at which boiling occurs and the composition of the vapor at the boiling point remain constant until one of the phases disappears. In these cases, physical separation at ordinary temperatures of the two liquids is merely a matter of removal in a separatory device of one of the phases. Examples of this class are toluene and water; ethyl ether and water; and the condensed vapor mixtures formed as the result of distilling with steam many high-boiling volatile organic liquids such as aniline and nitrobenzene containing non-volatile impurities in relatively small amounts.

The components, in the second type of constant boiling mixtures, are either partially or completely miscible, the composition of the vapor at the constant boiling temperature is not proportional to the partial pressures of the constituent substances at that temperature, and assuming no change in the ambient pressure the temperature at which boiling occurs and the composition of the vapor at the boiling point is not affected by continued vaporization. Variations in mutual solubilities due to changes in temperature determine the phasal relations, that is, a diphase system at one temperature may be a single phase system at another temperature. The constituents of this type constant boiling mixture are difficult to separate by distillation alone. Examples of single phase systems of this class are phenol and water; isopropyl alcohol and isopropyl ether; benzene and ethyl alcohol; and the ternary mixture of ethyl alcohol, methyl ethyl ketone and water. Examples of the two liquid phase systems are isopropyl alcohol, di-isopropyl ether and water; and water, the alcohols and their corresponding ester compounds. In these diphase systems there are two or more components. When three components are present usually one of the liquids is substantially insoluble in at least one of the other two components, and in each phase the components are in equilibrium.

In the constant boiling mixtures the constituents of which cannot be separated at ordinary temperatures by the removal of any of the phases in a separatory device, or are difficult to separate by distillation, the partial pressures of the components are either abnormally high or abnormally low as judged by Raoult's law. The boiling points of these mixtures or azeotropes, as they are usually termed, differ appreciably from the boiling points calculated on the basis of the vapor pressures of the individual components and the percentage concentrations of the constituents in a state of purely physical admixture. Indications of substances which form azeotropic mixtures are given by analyzing internal pressure and dielectric constant data and the solubilities in certain reference solvents. It is noticeable that substances having similar values of such properties and in juxtaposition in tabulations of data upon corresponding properties form solutions showing only small departures from Raoult's law whereas substances having widely different values of these properties and appreciably separated in the tabulations of corresponding data show appreciable departures from Raoult's law. These features are mentioned in order to indicate the general scope and application of the present invention.

The invention combines the principles of distillation and solvent extraction. The components of the liquid mixtures considered within the scope of the invention may be mutually miscible in certain proportions and at certain temperatures and pressures form single phase systems, while in other proportions and at other temperatures liquid-liquid diphase systems may be formed. The invention, therefore, is concerned with methods for the separation from ternary mixtures especially those forming diphase constant boiling mixtures, of the respective constituents which are ordinarily difficult to separate by distillation alone and one of which is soluble in a liquid relatively immiscible with at least one of the other constituents.

The method of the invention is to distill the mixture as supplied to separate any constituents, vaporizing before the constant boiling point mixture is attained, to distill the constant boiling mixture from any residue, to condense the vapors so obtained, to remove by solvent treating from the condensate, if of a single phase or from each phase separately if there are two phases, one of the constituents by a selective solvent or solvents relatively immiscible with the other components of the phase or phases, and then to distill separately the phases so obtained in order to isolate the individual components when they, at this stage, are not present in proportions to form constant boiling mixtures and are of appreciably different boiling points. As generally effected the condensate of the constant boiling mixture is treated with water, one of the constituents of each phase separation, but the use of liquids other than a constituent of the azeotrope and of distinct solvents for each phase are not excluded in the invention.

If mixtures approximating azeotropes are formed as a result of the removal of one of the constituents of the previous more complex mixtures, these secondary constant boiling mixtures are solvent treated to remove one of the constituents and then separation is made either in a separatory device or by distillation into the simple components. The solvent extraction is usually effected countercurrently either by batch or continuous treatment so as to allow the flow from the extraction equipment of relatively saturated solutions. The process may be effective under any pressure but it is preferably carried out at atmospheric pressure because of the relative convenience of operation.

It will be suitable to illustrate and convey an appreciation of the applicant's invention by reference to a specific azeotropic mixture, but it is not intended to limit the scope of the invention to this illustration, but merely to employ such for purposes of illustration. A convenient illustration is the separation of isopropyl alcohol, di-isopropyl ether and water from a mixture containing same.

In the manufacture of di-isopropyl ether by the partial hydration of propylene or the partial dehydration of isopropyl alcohol in the presence of catalysts, crude products are obtained which are mixtures of isopropyl alcohol, di-isopropyl ether and water. With these three constituents a di-phase constant boiling system boiling at 61° C., is formed with the following percentages concentrations by weight of di-isopropyl ether, 81.7%; isopropyl alcohol, 12.15%; and water, 6.15%. The boiling points of the individual components are respectively, di-isopropyl ether, 68.7° C.; isopropyl alcohol, 82.3° C.; and water, 100° C. It is noteworthy that the boiling point of the constant boiling mixture is below that of any of the individual constituents.

When a mixture of the above three compounds is fractionated, the vapor which separates first is that in which the constituents are present in the proportions corresponding to the constant boiling mixture. When this vapor is condensed to 25° C. a diphase system is formed, the upper layer forming 93.2% by weight of the total and the lower layer 6.8% by weight of the total. In the upper layer the three constituents are present in the following proportions by weight: di-isopropyl ether, 87.45%; isopropyl alcohol, 12%; and water, 0.55%. In the lower layer the constituents are present in percentages by weight of di-isopropyl ether, 1.5%; isopropyl alcohol, 11.5% and water 87.0%.

In addition to the ternary azeotrope formed by the three compounds, two component constant boiling systems are formed by any two of the substances. Thus, in the manufacture of isopropyl ether it is usually necessary to separate first the constituents of the ternary azeotrope formed by the substances water, isopropyl alcohol, and isopropyl ether and then to separate the constituents of a binary constant boiling mixture which is formed either as a residue after the distillation of the constant boiling mixture or as the residual mixture formed after separating one of the constituents from the ternary azeotrope.

In the preparation of isopropyl ether from isopropyl alcohol the isopropyl ether is normally mixed with isopropyl alcohol and water and usually the mixture is a single phase system. If the concentration of ether in the liquid stream from the ether plant is less than that of the constant boiling mixture which boils a 61° C., that is, appreciably less than 82% by weight of ether, it is advantageous to distill off the ternary azeotrope containing in weight percentages 81.7% of di-isopropyl ether, 12.15% of isopropyl alcohol and 6.15% of water until the ether is exhausted from the remaining components.

Such type mixtures, that is, those in which one of the constituent compounds is present in excess of the proportions in which a constant boiling mixture is formed, are supplied to an apparatus, a diagrammatic representation of a suitable form for which is given in the accompanying drawing. An appreciation of the invention can be gained by reading the following description in conjunction with the diagram to which the reference numerals relate.

The liquid mixture containing di-isopropyl ether, isopropyl alcohol and water in which the amount of isopropyl alcohol was in excess of that contained in the ternary constant boiling mixture was supplied through line 1 to distillation tower 2 at the base of which steam was injected through the sparger 3. The feed to the tower and the heat supply were adjusted to cause continuous vaporization of the azeotrope. The vapor corresponding in composition to that of the ternary constant boiling mixture was passed by line 4 to the condenser 5 and thence through line 6 to separator 7. In the separator 7 the condensate was allowed to remain for a sufficient period of time to permit the complete separation of the phases, the upper phase forming 93.2% by weight of the total condensate. The composition of the phases in weight percentages was for upper layer (93.2% by weight), di-isopropyl ether 87.45%, isopropyl alcohol 12.0% and water 0.55%; and for the lower layer, di-isopropyl ether 1.5%, isopropyl alcohol 11.5%, and water 87.0%. The upper phase was removed from the separator by the line 8 and passed to the extractor 9 which was filled with Rashig rings of 1″ diameter. The temperature and pressure of the tower were substantially atmospheric. Water was sprayed from the top of the tower through a distributor 10 in amount about equal to the volume of liquid flowing through the line 8. The Rashig rings in the tower assured thorough contact of the downward current of water with the liquid passing upward from the base of the tower. The alcohol-free ether was passed from the top of the tower 9 by line 11 to tower 12, which was a baffle column of customary construction. The tower 12 was operated at a temperature sufficient to cause boiling of the ether feed, the heat being supplied by closed steam coil 13. The overhead from the tower 12 containing all the water and some ether as binary azeotrope was passed by the line 14 to the condenser 15 and then by line 16 to the separator 17. The ether, free of water, was removed from the base of the tower 12 by line 18 to cooler 19 and then by line 20 to finished storage. The upper layer in the separator 17 was conducted partly through lines 21 and 22 to the tower 12 as reflux and partly through lines 21 and 23 to the feed line 8 to the tower 9. The lower layer from the separator 17 was passed by line 24 to the tower 2. The lower layer from the separator 7 can be passed by lines 25 and 24 to the tower 2. This lower layer can also be passed by line 26 to the feed line for the sprayer 10 in which case the amount of the spray is slightly more than the volume of the liquid flowing through the line 8. The aqueous alcohol solution from the tower 9 was passed through lines 27 and 24 to the tower 2. The distillation residue of tower 2 consisting mainly of isopropyl alcohol and water was passed by line 28 through the cooler 29 and thence through line 30 to storage tank 31.

The invention is not to be limited by any theory or particular mode of operation. The description and illustration of the invention are presented by way of explanation, but not of limitation, of the invention. It is intended to claim broadly all the novelty inherent in the invention and to be limited only by the appended claims.

It is claimed:

1. The process for the separation of isopropyl ether from a crude mixture containing isopropyl ether, isopropyl alcohol and water, one of these ingredients being present in excess of that contained in a constant boiling mixture, which comprises distilling said mixture to separate vapor having a constant boiling mixture, condensing the vapor so formed, allowing the condensate to stratify into a lower layer consisting mainly of water and into an upper layer consisting mainly of the isopropyl ether and isopropyl alcohol, extracting the isopropyl alcohol from the ether of the upper layer by passing said upper layer upwardly through an absorption tower countercurrently to a stream of water from the water layer to leave the ether with any entrained water, vaporizing the entrained water from said extracted ether, and recovering the thus treated ether whereby ether substantially free from the alcohol and water is obtained.

2. The process for the separation of di-isopropyl ether from a crude mixture containing di-isopropyl ether, isopropyl alcohol and water, the isopropyl alcohol and water being present in excess of that contained in a constant boiling mixture, which comprises distilling said mixture to separate vapor having a constant boiling mixture while withdrawing from the still residual isopropyl alcohol and water, condensing the vapor so formed, allowing the condensate to stratify into a lower layer consisting mainly of water and into an upper layer consisting mainly of the ether and alcohol, recycling a portion of the water layer into the crude mixture, extracting the isopropyl alcohol from the ether of the upper layer by passing the upper layer upwardly through an absorption tower countercurrently to a stream of water from the water layer to leave the ether with any entrained water, distilling the entrained water from the extracted ether, and recovering the thus treated ether whereby a purified di-isopropyl ether is obtained.

3. The method of purifying a crude ether containing isopropanol and water, the isopropanol and water being present in excess of that contained in a constant boiling mixture, which comprises distilling the crude mixture to take overhead a ternary azeotrope of ether, isopropanol and water while withdrawing from the still residual isopropanol and water, stratifying the distillate into a lower layer consisting mainly of water and into an upper layer consisting mainly of ether and isopropanol, extracting the isopropanol from the ether of the upper layer with water from the lower layer, returning the remainder of the water of the lower layer to the crude mixture, returning the extract to the crude mixture, distilling any water from the extracted ether and recovering the thus treated ether whereby purified ether is obtained.

4. The method of recovering ether from a crude mixture containing ether, isopropanol and water, the isopropanol and water being present in excess of that contained in a constant boiling mixture, which comprises distilling the crude mixture to take overhead a ternary azeotrope of ether, isopropanol and water, stratifying the distillate into a lower layer consisting mainly of water and into an upper layer consisting mainly of ether and isopropanol, removing water from the lower layer and returning it to the crude mixture, extracting the upper layer with water to remove isopropanol from the ether, returning the extract to the crude mixture, distilling the water and entrained ether from the extracted ether, recovering the thus treated ether whereby purified ether is obtained, stratifying the last named distillate into a lower layer of water and an upper layer of ether, returning the upper layer to the extraction zone, and returning the water to the crude mixture whereby a high yield of ether is obtained.

CLAYTON M. BEAMER.